Figure 1:
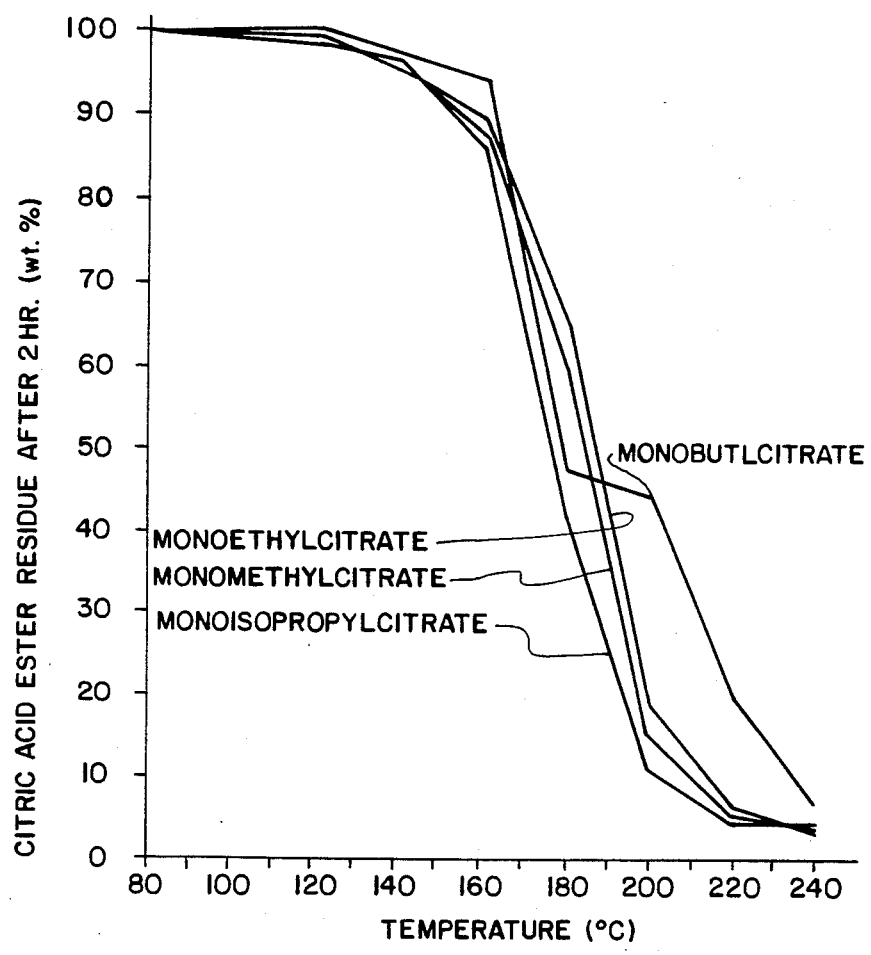

United States Patent [19]

Kretzschmann et al.

[11] Patent Number: 4,572,740
[45] Date of Patent: Feb. 25, 1986

[54] CITRIC ACID ESTERS AS BLOWING AND NUCLEATING AGENTS IN THE PROCESSING PLASTICS

[75] Inventors: Günther Kretzschmann, Munster-Sarmsheim; Dieter Scholz, Gau-Algesheim; Karl-Heinz Hilgert, Ingelheim, all of Fed. Rep. of Germany

[73] Assignee: Boehringer Ingelheim KG, Ingelheim am Rhein, Fed. Rep. of Germany

[21] Appl. No.: 716,295

[22] Filed: Mar. 26, 1985

[30] Foreign Application Priority Data

Mar. 28, 1984 [DE] Fed. Rep. of Germany ....... 3411319

[51] Int. Cl.[4] .......................... C08L 1/12; C08J 9/06
[52] U.S. Cl. .................................... 106/122; 106/178; 106/180; 106/181; 106/196; 521/79; 521/97; 521/130; 521/143; 521/145; 521/146; 521/147; 521/149

[58] Field of Search ............... 106/122, 178, 180, 181, 106/196; 521/97, 130, 79, 143, 145, 146, 147, 149

[56] References Cited

U.S. PATENT DOCUMENTS

| 3,200,176 | 8/1965 | Baxter | 521/79 |
| 3,488,299 | 1/1970 | Sato | 521/79 |
| 3,928,275 | 12/1975 | Hiyama et al. | |
| 4,330,635 | 5/1982 | Tokas | 521/97 |
| 4,369,227 | 1/1983 | Hahn et al. | 521/97 |
| 4,391,938 | 7/1983 | Memon et al. | |
| 4,425,443 | 1/1984 | Georlette et al. | 521/97 |

FOREIGN PATENT DOCUMENTS 1104165 10/1966 United Kingdom .

Primary Examiner—Morton Foelak
Attorney, Agent, or Firm—Alan R. Stempel; David E. Frankhouser; Charles J. Herron

[57] ABSTRACT

The invention relates to new blowing and nucleating agents for the processing of plastics, which are based on mono- and diesters of citric acid.

6 Claims, 2 Drawing Figures

CITRIC ACID ESTERS AS BLOWING AND NUCLEATING AGENTS IN THE PROCESSING PLASTICS

FIELD AND BACKGROUND OF THE INVENTION

This invention concerns the use of citric acid esters as blowing and nucleating agents in the processing of plastics.

Blowing agents are extensively used in the manufacture of foamed plastics. It is known to use citric acid together with sodium bicarbonate as a blowing agent.

Moreover, citric acid esters of higher alcohols, such as stearyl or lauryl citrate, are used as lubricants in the processing of plastics.

THE INVENTION

Surprisingly, it has now been found that certain esters of citric acid may also be used as blowing and nucleating agents in the processing of thermoplastics and elastomers.

More specifically, it has been found that both mono- and diesters of citric acid with lower alcohols having up to 8 carbon atoms can be used as blowing and nucleating agents. Suitable lower alcohols from which these citric acid esters can be formed are, for example: methanol, ethanol, propanol, isopropanol, n-butanol, isobutanol, sec-butanol, tert.-butanol, n-petanol, n-pentan-2-ol, n-pentan-3-ol, n-hexan-3-ol and the isomeric hexanols, n-heptan-1-ol, n-heptan-2-ll, n-neptan-3-ol, n-heptan-4-ll and the isomeric heptanols, n-octan-4-ol, n-octan-2-ol, n-octan-3-ol, n-octan-4-ol and the isomeric octanols, cyclopentanol and cyclohexanol.

Furthermore, diols or polyols with up to 8 carbon atoms may be used, such as ethyleneglycol, glycerol, pentaerythritol or lower polyethyleneglycols with up to 8 carbon atoms such as, for example, diethyleneglycol, triethyleneglycol or tetraethyleneglycol.

The mono- or diesters with monohydric alcohols having up to 6 carbon atoms are preferred and the mono-diesters with monohydric alcohols having up to 4 carbon atoms are most preferred.

The monoesters such as monomethylcitrate, monoethylcitrate, monopropylcitrate, monoisopropyl-citrate, mono-n-butylcitrate and mono-tert-butylcitrate are particularly preferred.

The term monoesters in the preceding definition covers both the $\alpha$-esters of citric acid and also the $\beta$-esters of citric acid or mixtures of $\alpha$- and $\beta$-monoesters of any desired composition. By mixing the $\alpha$- and $\beta$-esters in the desired proportions, mixtures may be obtained having lower melting points than the pure esters.

The term diesters in the preceding definition covers both the $\alpha,\alpha'$-diesters of citric acid and also the $\alpha,\beta$-diesters or mixtures of the $\alpha,\alpha'$- and $\alpha,\beta$-diesters of citric acid.

By mixing the $\alpha,\alpha'$- and $\alpha,\beta$-diesters in the desired proportions, mixtures may be obtained having lower melting points than the pure diesters.

The term diesters in the preceding definition also covers mixed esters of two different alcohols and this term includes all the possible structurally isomeric and steroisomeric compounds in pure form or in any desired mixture.

The citric acid esters falling within the terms of the above description are liquid, waxy or solid in structure. They may be used as liquid, paste, solid or melt alone and/or in admixture with other blowing agents and/or together with other adjuvants in the form of suitable preparations, e.g. as a master batch or as a granulate applied to a carrier granulate or they may be diluted with suitable solvents.

It should be particularly emphasized that citric acid esters are non-toxic compounds which may be used freely. This aspect of a high degree of safety in use is of major importance both in the production of foam plastics and also in the later end product.

The citric esters as described above may be used in thermoplastic melts in concentrations of from about 0.1 to 10%, more particularly from about 0.1 to 5% and preferably from about 0.3 to 2.5% as blowing agents, and in concentrations of from about 0.5 to 5.0%, more particularly from 0.05 to 2.5% and preferably from about 0.1 to 1.5% as nucleating agents.

The results of the heat stress experiment described in Example 1 demonstrate that representative citric acid esters embraced by the invention decompose only to a minor extent over a period of 2 hours at 140° C. Since many industrial grade citric acid esters melt below this temperature, they may either be incorporated directly as liquids in the thermoplastic melt or they may be further processed in their non-decomposed form with other solid or liquid adjuvants to form solid, pasty or liquid blowing agent preparations.

The heat stress experiment described in Example 1 is useful for determining the degree to which a given citric acid ester will decompose when subjected to a given temperature for a given time. Since the decomposition of the ester is accompanied by the generation of blowing gas, the results of the heat stress experiment are useful in determining the conditions to which the thermoplastic melt containing the ester must be subjected in order to bring about the development of blowing gas or nucleation. Further, the results of the experiment are also useful in determining the conditions under which an ester will not decompose, thus allowing one to adjust the processing conditions of the thermoplastic material so as to avoid the premature generation of blowing gas, say for example in the feed zone of an extruder. The results of the experiments performed in Example 1, wherein several representative citric acid estes were tested, demonstrate that conditions required for bringing about the decomposition of an ester will be dependent on the substitution of the ester. The monoesters decompose at lower temperatures than the corresponding diesters. Thus, by a suitable choice of esters, it is possible to prepare blowing agents which will be advantageously active in certain temperature ranges.

The temperature range within which the above described citric acid esters may be used as blowing agents or as nucleating agents is between about 160° C. and 300° C., preferably between about 170° C. and 280° C.; the temperature range from about 180° C. to 260° C. is particularly preferred.

The citric acid esters described to the invention may be used as blowing and nucleating agents for the production of foam plastics if the processing temperature of the plastics is between about 160° C. and 300° C., although temperatures of above 300° C. may occur for short periods. Suitable plastics include, for example: polyethylenes; ethylene-vinylacetate copolymers; ethylene-ethyleneacrylates; ionomeric polyethylenes; polypropylenes; polybutenes; polymethylpentenes; polystyrenes; impact-resistant polystyrenes; styrene-acrylonitrile copolymers; acrylic-butadienestyrene copolymers; ASA; polyvinylcarbazoles; polyvinyl chlorides; polytrifluoroethylenes; polytetrafluoroethylene-perfluoropropylene; polyvinylidene fluorides; ethylene-tetrafluoroethylene copolymers; polymethylmethacrylates; chlorinated polyethers; phenoxy resins; polyphenylene oxides; polysulphones; polyethersulphones; polyphenylenesulphides; polyurethane elastomers; cellulose acetates; cellulose propionates; cellulose-acetobutyrates and other thermoplastics or elastomers. Where appropriate, the plastic employed may be admixed with a plasticizer or other conventional additives.

As described in greater detail in Example 2, the ability of a citric acis ester as above described to generate gas, and hence to act as a blowing agent, can be assessed by measuring the volume of gas which a given amount of the ester produces when heated to a temperature between 180 and 260° C. for 10 minutes. The result obtained can then be compared with the result similarly obtained through the testing of a standard commercial blowing agent.

The results of the experiment described in example 2, which relate to the same representative citric acid esters tested in Example 1, demonstrate that the gas generating ability of the esters correlates with the degree to which they decompose when heated, as determined in Example 1. Particular mention should be made of the citric acid monoesters which yield gas volumes per kg of substance corresponding to the results obtained with a standard commercial product or even in excess thereof. Particular emphasis should be placed on isopropylcitrate the gas yield of which, determined at 240° C. and at 260° C., is virtually twice that of the standard commercial product.

As is also demonstrated by the values given in Table 2, the development of gas by the citric acid esters only begins to take place intensively in the temperature range from 200° C. to 220° C. or from 220° C. to 240° C. Good use may be made of this effect, for example, in the processing of plastics by injection moulding, since the blowing agent is added to the plastics melt in the feed part of the machine and can be heated to temperatures of over 200° C. in this melt for a few minutes without decomposing noticeably. The development of gas only begins intensively in the region of the screw and die, since these parts of injection moulding machines are generally operated at higher temperatures than the feed area. By contrast, the conventional blowing agents have by no means as marked a temperature profile.

In the manufacture of a structural foam moulding made from polystyrene, performed experimentally, savings of 27.5% to 42% in the batch weight are achieved (Example 3/Table 3), without having optimized the operating conditions for the citric acid ester used as a blowing agent. In each case the foam has a uniform coarse to fine-pored structure.

The suitability of the citric acid esters according to the invention as nucleating agents is demonstrated by the production of a sheet of polystyrene foam with direct gassing as described in Example 4.

It should be emphasized that, in the practical trials of the citric acid esters according to the invention, no discolouration of the plastics or residues of blowing agent could be detected.

An essential criterion for the quality of foamed plastics is the uniform pore formation of the foam structure which is due to the simultaneous and uniform expansion of incipient cells. Frequently, so-called "nucleating agents" are added to the actual blowing agent in order to induce the desired formation of tiny gas bubbles. The term "nucleating agent" is used in this sense herein.

In addition, the term "nucleating agents" is also used in the technology of plastics for agents which serve to induce crystalline partial structures in a polymer during the solidification of plastics melts; this is not what is meant here.

EXAMPLE 1

Heat stress (decomposition) of several citric acid esters

Figure 2:
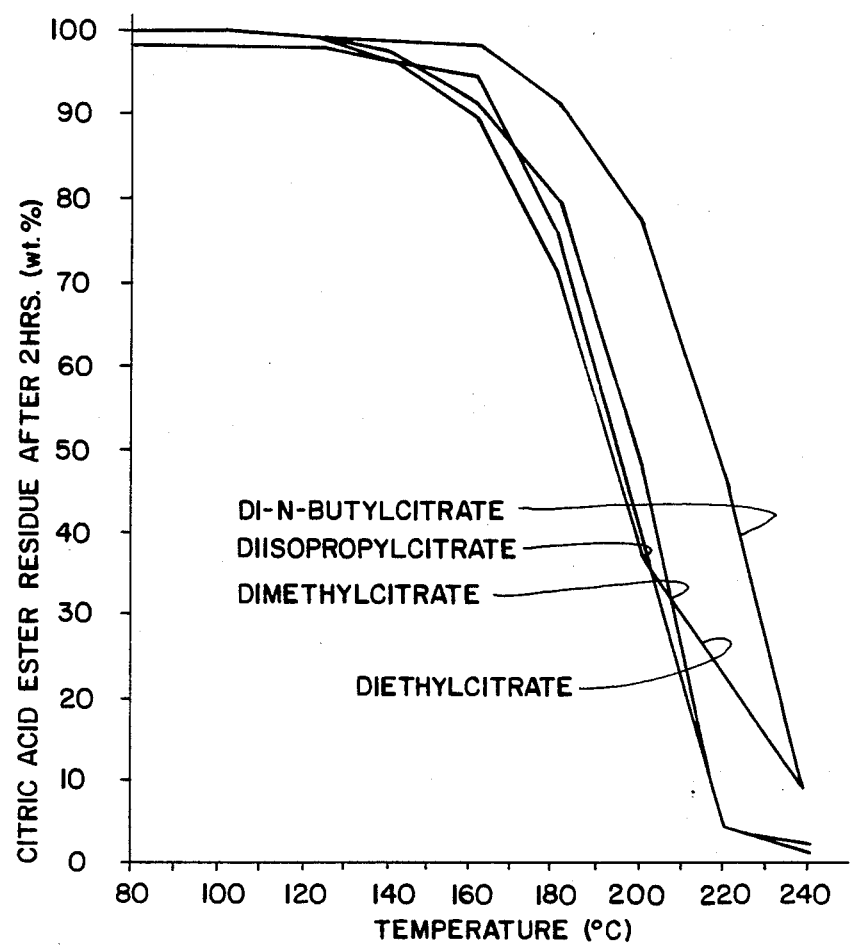

Referring to Table 1, which follows, 3.0 g of each of the listed citric acid esters are left at the temperature specified in an open vessel for 2 hours. The remainder of each is weighed and the residue is calculated in % based on the quality used. The results of these tests are shown in tabular form in Table I and illustrated graphically by FIGS. 1 and 2.

TABLE 1

| Residue of citric acid ester (expressed in wt. %) remaining after subjecting 3 gram sample to indicated temperature for 2 hours. | | | | | | | | | |
|---|---|---|---|---|---|---|---|---|---|
| Product | 80° C. | 100° C. | 120° C. | 140° C. | 160° C. | 180° C. | 200° C. | 220° C. | 240° C. |
| Monomethylcitrate | 100% | 100% | 99.3% | 96.0% | 87.6% | 58.3% | 15.3% | 5.3% | 3.6% |
| Monoethylcitrate | 100% | 100% | 99.3% | 95.3% | 89.0% | 64.6% | 19.3% | 6.0% | 3.3% |
| Mono-n-butyl-citrate | 100% | 100% | 100% | 97.6% | 94.0% | 47.3% | 43.3% | 19.6% | 6.6% |
| Dimethylcitrate | 100% | 100% | 99.3% | 96.3% | 89.6% | 75.6% | 34.7% | 4.3% | 2.6% |
| Di-n-butylcitrate | 100% | 100% | 99.0% | 98.6% | 98.3% | 91.3% | 76.7% | 48.3% | 9.3% |
| Di-isopropylcitrate | 100% | 100% | 99.6% | 97.0% | 91.6% | 79.6% | 48.3% | 4.0% | 2.0% |
| Diethylcitrate | 98.4% | 98.2% | 98.0% | 96.0% | 89.6% | 71.2% | 43.2% | 23.0% | 8.6% |
| Monoisopropyl-citrate | 100% | 99.2% | 98.4% | 96.4% | 86.2% | 41.4% | 11.0% | 4.6% | 4.4% |

EXAMPLE 2

Development of blowing gas from various citric acid esters

The development of blowing gas by each of the citric acid esters listed in the following Table 2 is measured by exposing these agents to temperatures ranging from 180°–260° C. Each sample of the citric acid ester in question is brought to the temperature specified for 10 minutes. The retention time of 10 minutes includes about 3 minutes as the dynamic heating time from 20° C. to the final temperature.

For the purposes of comparison, the development of blowing gas by a standard commercial mixture of citric acid and sodium hydroxide hydrogen carbonate is also measured by subjecting this agent to temperatures in the same range.

The quantities of gas developed by these various substances at the test temperatures employed are given in Table 2, expressed as liters of gas generated per kg of blowing agent employed, measured at normal conditions (1 atmosphere, 20° C.).

TABLE 2

| Test Conditions | Di-isopropyl-citrate [l/kg] | Mono-n-butyl-citrate [l/kg] | Monomethyl-citrate [l/kg] | Monoethyl-citrate [l/kg] | Di-n-butyl-citrate [l/kg] | Dimethyl-citrate [l/kg] | Diethyl-citrate | Monoiso-propyl-citrate | Standard commercial product** |
| --- | --- | --- | --- | --- | --- | --- | --- | --- | --- |
| 10 Min*/ 180° C. | 2.2 | 1.7 | 4.4 | 2.5 | 0.9 | 2.2 | 3.4 | 4.4 | 58.1 |
| 10 Min*/ 200° C. | 3.6 | 3.7 | 7.9 | 4.7 | 2.6 | 3.2 | 6.5 | 21.0 | 96.4 |
| 10 Min*/ 220° C. | 21.6 | 27.0 | 43.3 | 41.3 | 7.3 | 17.6 | 20.2 | 90.3 | 109.5 |
| 10 Min*/ 240° C. | 51.6 | 70.8 | 102.9 | 100.1 | 28.2 | 38.7 | 45.2 | 228.5 | 128.4 |
| 10 Min*/ 260° C. | 90.3 | 121.6 | 158.7 | 137.7 | 47.9 | 96.96 | 86.3 | 258.5 | 131.9 |

*The period of 10 minutes includes 3 minutes as the dynamic heating time from about 20° C. up to the final temperature specified.
**Standard commercial propellant consisting of a mixture of citric acid and sodium hydrogen carbonate

EXAMPLE 3

Preparation of a structural foam moulding

Several batches of industrial-grade polystyrene granulate are processed to form structural foam mouldings. The blowing agents used are the various esters of citric acid listed in Table 3 and a standard commercial blowing agent consisting of sodium bicarbonate and citric acid. A Battenfeld injection moulding machine is employed in each case, operating at the following processing temperatures:

feed area: 190° C.
screw temperature: 240° C.
die temperature: 250° C.

The physical characteristics of the foam mouldings so produced are given in Table 3.

TABLE 3

| Blowing agent | Blowing agent content [% by wt] | Batch weight [g] | Reduction in weight [%] | Foam structure |
| --- | --- | --- | --- | --- |
| No blowing agent | 0.0 | 394 | | None, compact |
| Standard cmmercial product* | 1.0 | 232 | 41 | uniform, fine-pored |
| Monomethylcitrate | 0.7 | 248 | 37 | relatively coarse-pored |
| Monoethylcitrate | 0.7 | 250 | 36.5 | coarse-pored, uniform |
| Monoisopropylcitrate | 0.7 | 227 | 42 | relatively coarse, uniform |
| Di-n-butylcitrate | 0.7 | 275 | 30 | coarse-to fine-pored |
| Diethylcitrate | 0.7 | 285 | 27.5 | coarse-pored, uniform |
| Diisopropylcitrate | 0.7 | 294 | 25 | relatively fine-pored uniform |
| Di-n-butylcitrate | 0.7 | 282 | 28.5 | relatively coarse-pored |

*Standard commercial blowing consisting of sodium bicarbonate and citric acid

EXAMPLE 4

Preparation of a sheet of polystyrene foam

The use of citric acid esters as nucleating agents is tested in the production of a sheet of polystyrene foam in which direct gassing with trichlorofluoromethane is employed rather than the use of a blowing agent. The polystyrene resin and citric acid ester mixture is processed in a Columbo extruder at the following processing temperatures:

feed area: 210°
zone 2 (direct gassing with tri-chlorofluoromethane): 202°
die: 230°

The resin employed is industrial grade polystyrene.

The results of several practical tests carried out in this manner are shown in Table 4, which follows.

TABLE 4

| Nucleating agent | Content of nucleating agent [% by wt] | Density of sheet | Foam structure |
| --- | --- | --- | --- |
| Standard commercial* product | 0.4 | 0.07 | medium-fine |
| Diethylcitrate | 0.375 | 0.06 | rather coarse |
| | 0.4 | 0.063 | medium-fine |
| Monoisopropylcitrate | 0.375 | 0.065–0.074 | rather coarse |

*Standard commercial blowing agent consisting of sodium bicarbonate and citric acid

What is claimed is:

1. A method for producing foam or cellular plastic which comprises forming said plastic from a composition which includes a thermoplastic organic material and a mono- or diester of citric acid formed with an alcohol having up to 8 carbon atoms and heating said composition to produce said foam.

2. The method of claim 1 wherein said citric acid ester is formed with an alcohol having up to 4 carbon atoms.

3. The method of claim 2 wherein said citric acid ester is selected from the group comprising monomethylcitrate, monoethylcitrate, monopropylcitrate, monoisopropylcitrate, mono-n-butylcitrate and mono-tert-butylcitrate.

4. The method of claim 1 wherein said composition comprises about 0.1 to 10 weight percent of citric acid ester.

5. The method of claim 1 wherein said composition comprises about 0.05 to 5 weight percent of citric acid ester.

6. The method of claim 1 wherein said composition is processed between about 160° and 300° C. to yield said foam or cellular plastic.

* * * * *